June 17, 1958        B. SMITH, JR        2,838,876
BASIC ELECTRICAL CIRCUIT FOR LIGHT DRIVEN TOYS
Filed March 10, 1955        2 Sheets-Sheet 1

INVENTOR, Bennie Smith Jr.

June 17, 1958        B. SMITH, JR        2,838,876
BASIC ELECTRICAL CIRCUIT FOR LIGHT DRIVEN TOYS
Filed March 10, 1955        2 Sheets-Sheet 2
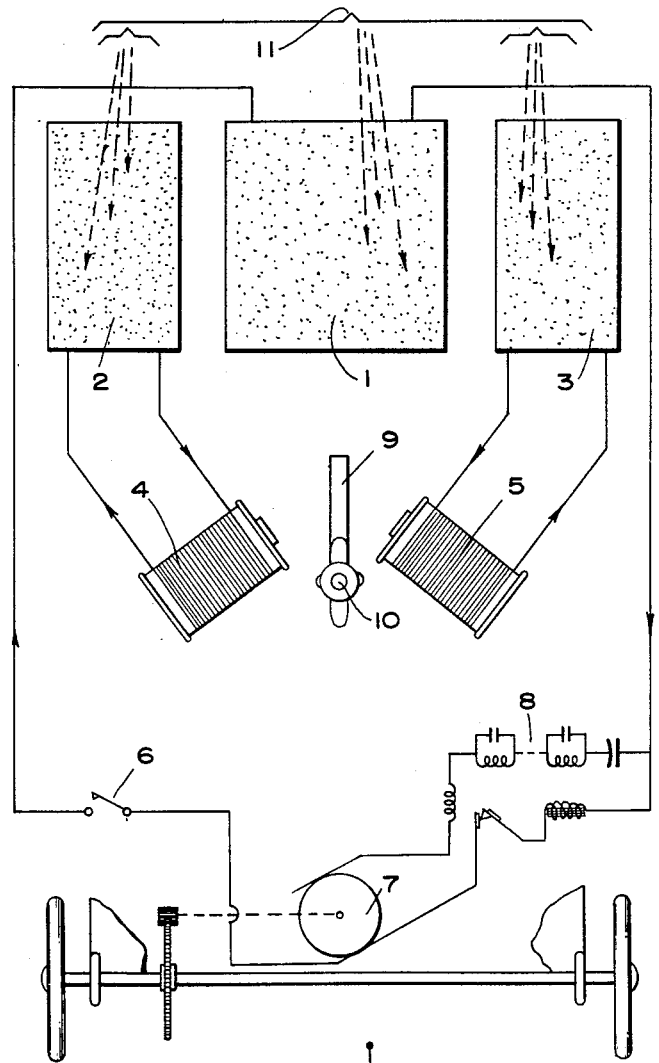
FIG.2
FIG.3
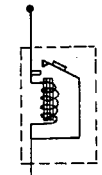
FIG.4
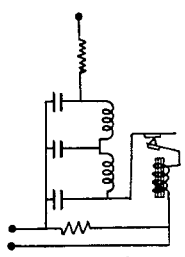
FIG.5
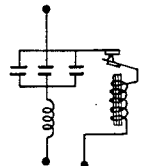
FIG.6
FIG.7
INVENTOR
*Bennie Smith Jr.*

United States Patent Office 2,838,876
Patented June 17, 1958

2,838,876

BASIC ELECTRICAL CIRCUIT FOR LIGHT DRIVEN TOYS

Bonnie Smith, Jr., Philadelphia, Pa.

Application March 10, 1955, Serial No. 493,527

5 Claims. (Cl. 46—244)

*Summary.*—This invention relates generally to a basic electrical circuit for light driven toys. The circuit provides a means whereby rolling, hopping, jumping or swimming toys may derive or obtain their total drive power from a remotely located source of either direct or indirect light.

In the preferred or general form, the circuit remains basic and may be used to motivate or drive any kind of toy in existence which gets its entire driving power and are formed to resemble various kinds of land beetles or water bugs and insects.

This means of motivation for toys is unique in that to the best of my knowledge there is presently no moving toy in existenc which gets its entire driving power and maneuvering from a remote source of light such as the sun or an incandescent bulb or light beam.

Numerous types of efficient light-to-electrical energy conversion surfaces have been developed. Some surfaces and materials such as cadmium sulfide have a practical conversion efficiency of 18% or more. Silicon cells have been developed during recent years, which have an energy conversion efficiency of 20%. At the present time, there is a silicon cell commercially available which has an average practical conversion efficiency of ten percent. It may be shown that with a conversion efficiency of ten percent a six inch surface of silicon cells will produce three watts of electrical energy in bright sunlight.

Since it is entirely practical to use converted light energy as drive power for toys, such toys would be designed to utilize light energy by means of a basic electrical circuit having a small inductive load therein. The amount of power obtainable, would depend upon (1) the brilliance of the light source, (2) the area of the effective conversion surface and (3) the efficiency of the conversion material used.

Any of a number of different kinds of small high speed rotary type A. C. and D. C. drive motors may be used. Some commercially available motors of the sub-miniature type will operate at high speeds on as little as 0.8 watt. Vibratory type motors will give rotary thrust with an input power source of considerably less than 0.8 watt. These motors may be geared to wheels or other motivating means by torque increasing speed reduction gear trains, thereby supplying plenty of thrust power to drive various kinds of toys and model craft.

It is one object of the invention to provide a light driven means within a toy which enables said toy to dodge the shadow of a hand or other moving object in a lighted area.

Another object of the invention is to provide a light activated electrical circuit and driving means for toys which has a long life and can be economically produced.

Another object of the invention is to provide a sub-miniature and very weight-deficient electrical driving means for toys simulating insect life.

Still another object of the invention is to provide means within a toy which enables it to be motivated by and follow a beam of light in a darkened area.

Still further novel type objects of the invention, which it is believed have never been achieved before except by live agencies, will become apparent to persons familiar with, or skilled in, the field of toy construction.

The present invention distinguishes over known devices or means of toy motivation in that it permits toys to be powered by light rays.

Two preferred and proven forms, of the fundamentally basic electrical circuit for light driven toys, are described in the detailed description and illustrated in the drawings, in which:

Fig. 2 shows the much same basic hook-up as Figure 1, with the exception that a capacitive inductive storage unit 8 for electrical energy has been included in the electrical circuit hook-up to provide a higher level of pulsed electrical energy in jumping toys, or toys requiring momentary high power.

Fig. 3 shows a gaseous bulb type switch, which will ionize and close a circuit allowing current flow when its characteristic break-down potential is applied. This type switch may be used in the drive circuit at point 6 the same as any other switch.

Fig. 4 shows one type of inductively controlled switch, which can be used in the drive circuit.

Fig. 5 shows one type of capacitive-inductive charging storage unit that can be used in the basic drive circuit.

Fig. 6 shows another type of capacitive-inductive charging storage unit that may be used in the basic drive circuit.

Fig. 7 shows still another type of capacitive-inductive charging storage unit which can be used in the basic drive circuit.

Figure 1:
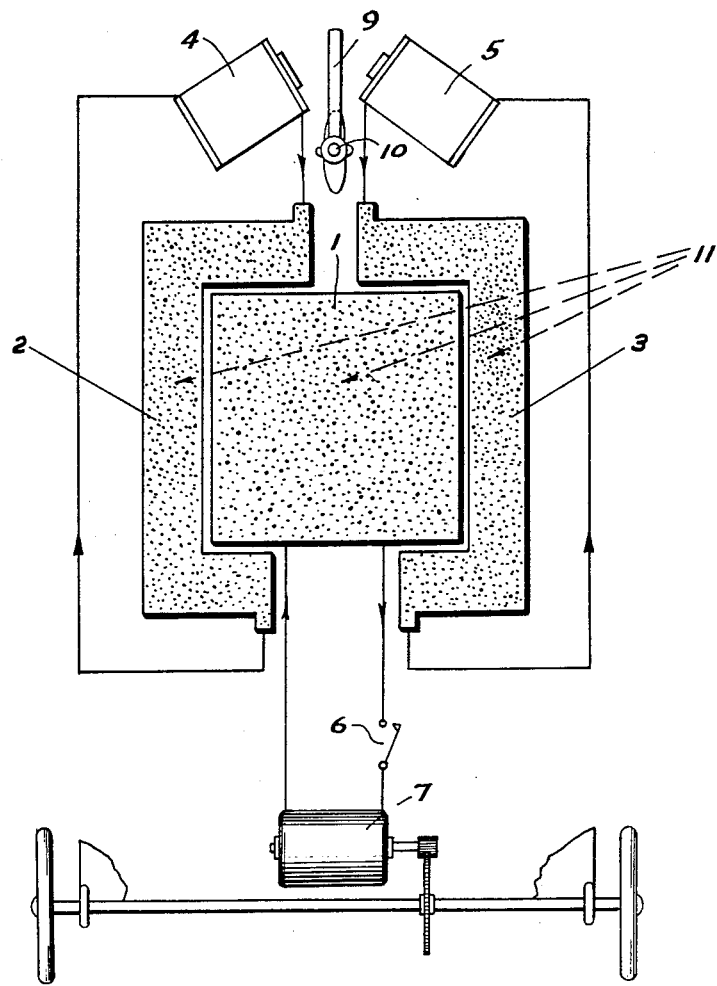
Fig. 1 is a system diagram including electrical circuit hook-up and mechanical means necessary in building a light driven toy.

*Basic electrical circuit for light driven toys*

Referring to the system diagram and characters of reference, there is shown in drawing Fig. 1, a basic electrical circuit for light driven toys, in which blocks number 1, 2 and 3 represent separate light-to-electrical energy conversion surfaces which may be made of strips or segments of any high efficiency and low cost energy conversion material. Conversion surface block 1 will cover most of the outer surface of the toy and be protected and insulated by a thin transparent plastic material. Strips or segments of this energy conversion surface will be wired together as batteries would be in series-parallel, thereby giving the necessary output level of electrical energy to drive the toy when it is subjected to light.

Direction of flow of electrical energy is indicated in the circuit by arrow head pointers. Electrical energy from surface block number 1 flows down through switch 6 which may be either a normally open circuit closing switch of the gaseous bulb type, or an inductively controlled drive circuit switch. After energizing and passing through switch 6, the electrical energy flows through and energizes inductive type vibratory or rotary drive motor 7 thereby giving the toy forward motion.

Conversion surfaces 2 and 3 are in left and right hand maneuvering circuits respectively. The surfaces 2 and 3 have equal areas and output energy levels. They are constructed much the same as conversion surface 1. Surface number 2, being in the left hand maneuvering circuit of the toy, is physically located in a band or outer rim encircling the left half of the toy. When the toy is subjected to light, electrical energy constantly energizes sub-miniature electromagnet block 4 which sets up a magnetic field of the same intensity as does electromagnet 5 in the right hand maneuvering circuit. Conversion surface 3, which produces electrical energy for energizing sub-miniature electromagnet 5, is physically located in a band or outer rim encircling the right hand half of the toy. A pivoted bar type guide lever of the kind designated 9 in Fig. 2, and pivoted at point 10, is located directly between electromagnets 4 and 5. While surfaces 2 and 3 are receiving the same amount of light energy, the bar guide lever which is attached to wheels or other guiding means through pivot axis 10, remains equidistantly centered between the electromagnets 4 and 5 in such manner that the toy moves in a straight path. As an example, when a shadow falls upon conversion surface 3, the output level of this surface is decreased, electrical energy flow through electromagnet 5 is lowered and electromagnet 4 pulls guide lever 9 to the left, causing the toy to steer away from the shadow which is in the travel path. Whenever the balance of electromagnets 4 and 5 is upset by a shadow, the toy always steers away from the shadow.

Referring to the block diagram and characters of reference, there is shown in drawing Fig. 2, a basic electrical circuit for light driven toys which is much the same as the circuit in Fig. 1, with the exception that a capacitive-inductive type charging and storage component 8 is added to the drive circuit. Electrical energy storage component 8 is used in the electrical drive circuit of toys which jump or move erratically, as with sudden forward surges. This type movement may be attributed to the ratio of charging time to discharging time of component 8. Operation of the electrical circuit for light driven toys is described as follows.

Light energy from a remote source of light such as an incandescent bulb, is beamed upon or falls upon light-to-electrical energy conversion surfaces 1, 2 and 3. The light energy falling upon conversion surfaces 2 and 3, is changed into electrical energy at a fairly high rate and flows through electromagnets 4 and 5 respectively which are located in left and right hand maneuvering circuits. So long as the electrical energy flowing through these electromagnets is equal, the guide lever 9 remains in the central position allowing the toy to travel in a straight path. When a shadow strikes the conversion surface of one of the balanced maneuvering circuits, the magnetic property of the electromagnet in its circuit is reduced, allowing the opposite electromagnet to steer the toy out of the shadow or away from the shadow producing object. Conversion surface 1 has a larger area than surfaces 2 and 3 and is wired into the toy's electrical drive circuit, thereby producing all the necessary drive power. Electrical energy from surface 1 flows to and charges up capacitive-inductive storage component 8. When the amount of electrical energy stored in 8 reaches a level high enough to short across the gap of gaseous bulb type switch 6, the electrical return circuit is completed and drive means 7 is momentarily energized causing the toy to move forward. It will be readily understood by persons familiar with electronic circuitry that the charging time constant of component 8 can be of a nature giving the desired toy action or repetition of action; the type of toy drive action being relative to the combination of the area of surface 1 and the charging time of component 8, both being variable to some extent or fixed in accordance with the specific design of the toy.

This description is intended to be illustrative and does not constitute a limitation upon the scope of the invention.

That which I believe to be novel and useful, and which I wish to secure by Letters Patent is:

1. In combination with a dirigible toy having steering means; a self contained electric power circuit comprising a centrally located light-to-electrical energy conversion surface for the production of electrical drive power, said surface having connected thereto a series loop circuit wherein a circuit making and breaking switch is electrically connected in combination with an inductive drive motor; said central conversion surface being in part surrounded by but insulated from right and left rim energy conversion surfaces which are connected respectively to electrically balanced right and left maneuvering series loop circuits, said maneuvering loop circuits each containing an electromagnet, said electromagnets being physically located in such manner as to selectively actuate said steering means in response to light falling on said right or left rim surfaces.

2. In combination with a dirigible toy having steering means, a self contained electric power circuit comprising a first light-to-electrical energy conversion surface having conducting means connected thereto in the form of a loop type drive circuit, said drive circuit having electrically connected therein a capacitive-inductive charging storage unit, an inductive drive motor and a circuit making and breaking switch, said first conversion surface being surrounded in part by but insulated from right and left rim light-to-electrical energy conversion surfaces, each of said rim surfaces having electrically connected thereto an electrically balanced loop type conducting circuit wherein an electromagnet is connected and positioned in such manner as to selectively actuate said steering means in response to light falling on said right or left rim surfaces.

3. In combination with a dirigible toy having steering means, a self contained electric power circuit comprising a first light-to-electrical energy conversion surface connected in a conducting loop circuit including a capacitive-inductive charging storage unit, a vibratory switch and an inductive drive motor, whereby discharge of said capacitive-inductive unit varies the level of electrical energy applied to said drive motor; second and third light-to-electrical energy conversion surfaces surrounding in part but insulated from said first energy conversion surface, said second and third surfaces each having connected thereto a series loop conducting circuit, said series loop circuits being electrically balanced with respect to one another and each containing an electromagnet, said electromagnets selectively actuating said steering means in response to light falling on said second and third surfaces.

4. In combination with a dirigible device having steering means, a self contained electrical power circuit comprising a conducting loop drive circuit connected to and receiving its electrical power from a first light-to-electrical energy conversion surface, said loop drive circuit having electrically connected therein a capacitive-inductive charging storage unit, an inductive drive motor and a vibratory switch, said drive motor being connected to a mechanical drive means, second and third light-to-electrical energy conversion surfaces insulated from the first and each connected in a series conducting loop circuit, said series loop circuits being electrically balanced with one another and each containing an electromagnet so positioned as to selectively actuate said steering means in response to light falling on said second and third surfaces.

5. In combination with a dirigible device having steering means, self contained electrical power circuits comprising a conducting loop providing an electrical path including a first light-to-electrical energy conversion surface, a capacitive-inductive charging storage unit, an inductive drive motor, and a circuit making and breaking switch, second and third light-to-electrical energy conversion surfaces each connected in a series circuit containing an electromagnet, said series circuits being electrically balanced with respect to one another and selectively actuating said steering means.

References Cited in the file of this patent

UNITED STATES PATENTS

| | | |
|---|---|---|
| 1,796,157 | Moore | Mar. 10, 1931 |
| 2,669,635 | Pfann | Feb. 16, 1954 |